United States Patent
Frissenbichler (10) Patent No.: US 12,486,108 B2
(45) Date of Patent: Dec. 2, 2025

(54) SHUTTLE FOR ROLLS AND SHUTTLE FOR SUSPENDED ROLLS

(71) Applicant: Fb Industry Automation GmbH, Albersdorf-Prebuch (AT)

(72) Inventor: Werner Josef Frissenbichler, Albersdorf-Prebuch (AT)

(73) Assignee: FB INDUSTRY AUTOMATION GMBH, Albersdorf-Prebuch (AT)

( * ) Notice: Subject to any disclaimer, the term of this patent is extended or adjusted under 35 U.S.C. 154(b) by 140 days.

(21) Appl. No.: 18/012,890

(22) PCT Filed: Jun. 23, 2021

(86) PCT No.: PCT/EP2021/067127
§ 371 (c)(1),
(2) Date: Dec. 23, 2022

(87) PCT Pub. No.: WO2021/259993
PCT Pub. Date: Dec. 30, 2021

(65) Prior Publication Data
US 2023/0356943 A1 Nov. 9, 2023

(30) Foreign Application Priority Data
Jun. 24, 2020 (DE) .................... 10 2020 207 826.2

(51) Int. Cl.
| | |
|---|---|
| *B65G 1/04* | (2006.01) |
| *B66F 9/14* | (2006.01) |
| *B66F 9/18* | (2006.01) |

(52) U.S. Cl.
CPC ............ *B65G 1/0407* (2013.01); *B66F 9/149* (2013.01); *B66F 9/18* (2013.01); *B65G 2201/0232* (2013.01)

(58) Field of Classification Search
CPC .. B66C 1/26; B66C 1/24; B66F 9/149; B65G 2201/0232
See application file for complete search history.

(56) References Cited

U.S. PATENT DOCUMENTS

| | | | | |
|---|---|---|---|---|
| 5,674,049 A | * | 10/1997 | Pienta | B65H 19/123 414/679 |
| 5,688,009 A | * | 11/1997 | Pienta | B21C 47/006 414/911 |

(Continued)

FOREIGN PATENT DOCUMENTS

| | | |
|---|---|---|
| CN | 204110946 U | 1/2015 |
| CN | 104358215 A | 2/2015 |

(Continued)

OTHER PUBLICATIONS

Machine translation of JP2006160477 from espacenet. (Year: 2006).*

(Continued)

*Primary Examiner* — Mark C Hageman
(74) *Attorney, Agent, or Firm* — Seed Intellectual Property Law Group LLP (57) ABSTRACT

The present invention relates to a roll shuttle and a suspended roll shuttle, which are each displaceable and equipped with a load mandrel (22) for transporting at least one roll to be stored. In the case of the roll shuttle, the load mandrel (22) is pivotably fastened to the running slide (16) in a plane that is substantially parallel to the storage plane of a shelf system. The suspended roll shuttle (42) can be moved along a sliding rail (40). The present invention also relates to a shelf system and a suspended rail system including distributing stations as well as to a method for operating the shelf system according to the invention.

14 Claims, 12 Drawing Sheets

(56) References Cited

U.S. PATENT DOCUMENTS

| | | | |
|---|---|---|---|
| 9,630,777 B2* | 4/2017 | Yamashita | B65G 1/1375 |
| 10,882,693 B2* | 1/2021 | Heide | B65G 1/0435 |
| 2013/0209203 A1* | 8/2013 | Rafols | B66C 9/10 |
| | | | 414/666 |
| 2019/0135539 A1 | 5/2019 | Heide et al. | |

FOREIGN PATENT DOCUMENTS

| | | |
|---|---|---|
| CN | 105668134 A | 6/2016 |
| CN | 106144418 A | 11/2016 |
| DE | 3632237 A1 | 4/1988 |
| EP | 2754625 A1 | 7/2014 |
| JP | S48100870 A | 12/1973 |
| JP | S571108 A | 1/1982 |
| JP | S595504 U | 1/1984 |
| JP | S6093605 U | 6/1985 |
| JP | S62244803 A | 10/1987 |
| JP | H0539107 A | 2/1993 |
| JP | 2006160477 A | 6/2006 |
| JP | 2007062973 A | 3/2007 |
| WO | WO 2019213715 A1 | 11/2019 |

OTHER PUBLICATIONS

Machine translation of JPS62244803 from espacenet. (Year: 1986).*
Konecranes, "5-Step Guide for Selecting the Right Cranes for Steel Warehousing," 2016, 11 pages.
Konecranes, "Footwalks and ladder standards," 2025, 3 pages.

* cited by examiner

SHUTTLE FOR ROLLS AND SHUTTLE FOR SUSPENDED ROLLS

The present invention relates to providing a roll shuttle and a suspended roll shuttle, in particular in conjunction with a suspended roll shuttle, in particular in conjunction with the operation of a shelf system and a transport system for handling rolls.

In existing storage systems, forklift trucks and stacker cranes form the basis for inserting articles and removing them from storage. However, forklift trucks and stacker cranes of this kind generally require significant space, and are restricted in terms of the flexibility of the storage.

Furthermore, known forklift trucks generally require significant space for maneuvering, such that the use thereof leads to a reduction in the capacity available for the storage.

In view of the above statements, the technical problem of the present invention is that of increasing the flexibility and the throughput in a roll storage and transport system.

According to the present invention, this problem is solved by a roll shuttle for transporting rolls in a shelf system having the features of claim 1.

Furthermore, the stated technical problem is solved by a shelf system for storing and transporting rolls according to claim 13, in which at least one roll shuttle according to the invention, and preferably also the suspended roll shuttle according to the invention, is used for the described intermediate transport between different locations.

Within the context of the present invention, rolls can be inserted into and removed from storage, one or more deep, by means of a mandrel system. For this purpose, the mandrel system is provided with a chain conveyor and preferably with a stop, in order to ensure orderly positioning of the rolls during transport and during storage.

By means of suitable dimensioning of the mandrel system length, rolls one or more deep in the shelf system can be manipulated. Within the context of the present invention, the mandrel system can be designed either as a roll shuttle or as a suspended roll shuttle. In the case of the roll shuttle, the mandrel system is displaceably and pivotably mounted on a chassis, while in the case of the suspended roll shuttle the mandrel system is mounted on a suspended slide which can be pushed back and forth on a travel rail.

Preferably, the rolls are positioned on the mandrel system having an increasing or the same diameter, towards the outside, such that the roll can be received and handled by means of a sleeve at the center of the rolls.

It should furthermore be noted that, in the case of the roll shuttle, the double mounting of the mandrel system, i.e. displaceably in a transverse direction with respect to the direction of travel of the chassis, and pivotably relative to the suspension of the mandrel, handling of the mandrel system can be achieved such that even in the case of pivoting of the mandrel from one side to the opposite side of the chassis the mandrel is always guided such that it never extends over the sides of the chassis. This results in a particularly compact design of the roll shuttle, and allows a superimposed mode of operation, in which one the one hand the roll shuttle is movable in the longitudinal direction, and on the other hand the position of the roll with respect to the storage can also be simultaneously modified. Preferred embodiments of the present invention are specified in the dependent claims.

Preferred embodiments of the present invention will be explained in the following, with reference to the drawings, in which.

Figure 1:
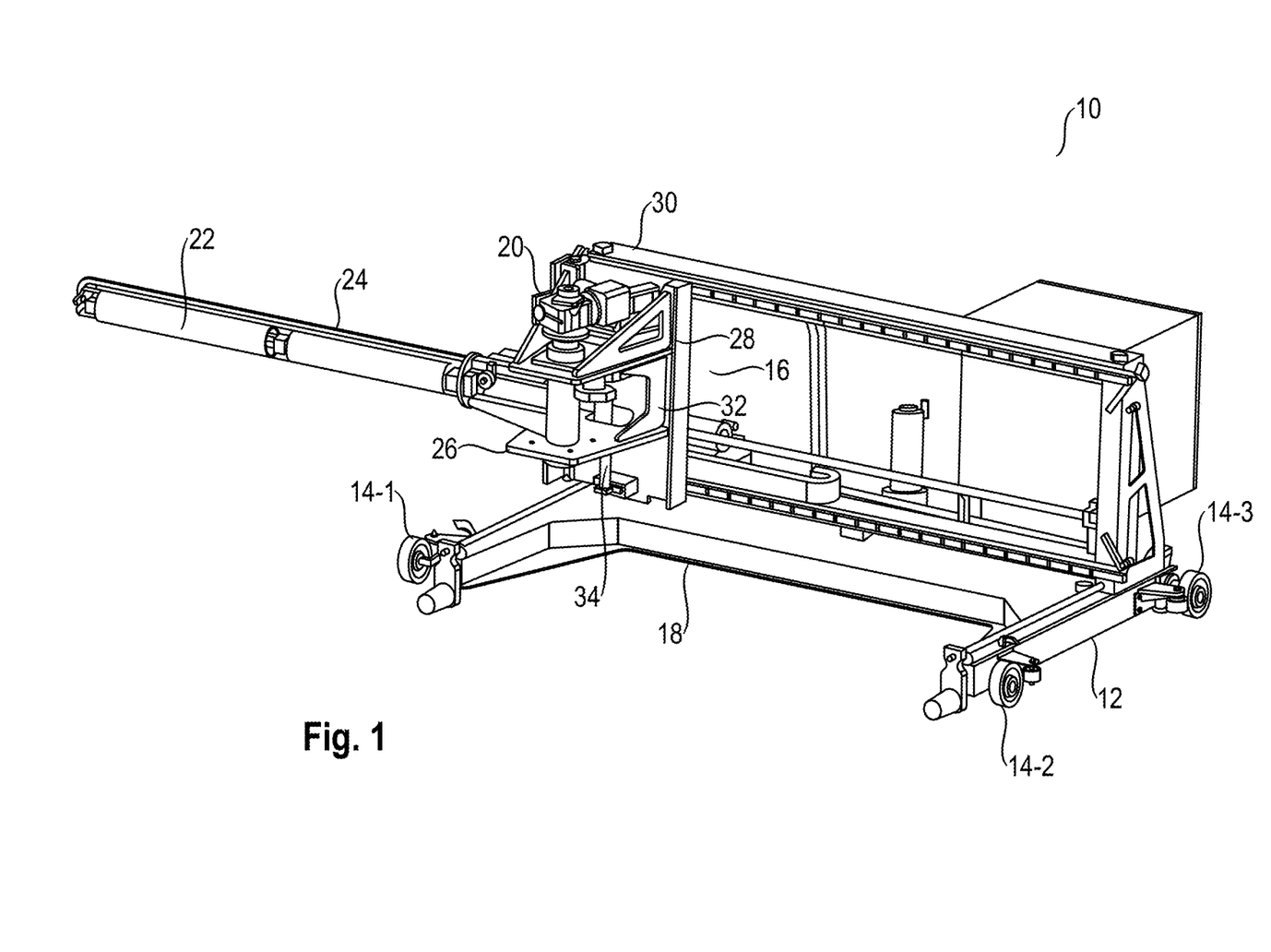
FIG. 1 is a perspective view of the roll shuttle according to the invention.

As shown in FIG. 1, the roll shuttle 10 according to the invention for transporting rolls in a shelf system comprises a chassis 12, having wheels 14-1, . . . , 14-3 mounted thereon, in order to move the roll shuttle along travel rails which are laid in a storage plane of the shelf system.

As shown in FIG. 1, the roll shuttle 10 according to the invention comprises a running slide 16 which is mounted on the chassis 12 such that it is movable relative to the direction of travel of the roll shuttle. The roll shuttle 10 can in each case move in one plane or in a plurality of planes, wherein in the latter case the roll shuttle can be offset, by means of a shuttle relocation means, between different planes, such that a shelf system can be served even in the case of just a few roll shuttles 10. The roll shuttle 10 can furthermore also travel or be operated outside of a shelf system. For this purpose, it is placed on a travel rail outside the shelf system, by means of a vertical relocation means, or it travels out of the shelf system via a rail extension, in order to serve a transfer station. At said transfer system, the rolls are transferred to the shelf system or taken out of the shelf system.

In general, the running slide 16 is movable such that the direction of movement deviates, relative to the direction of travel of the roll shuttle 10, by a predetermined angle greater than zero, for example by an angle of 90 degrees. Accordingly, the running slide 16 is preferably movable transversely to the direction of travel of the chassis 12.

As shown in FIG. 1, the running slide 16 can comprise a base plate 18, on which individual elements can then be mounted. The base plate 18 is moved for example by means of a chain conveyor, on a vertical frame of the running slide. For this purpose, an electric motor 20 can be provided for driving the running slide.

As shown in FIG. 1, the roll shuttle 10 according to the invention further comprises a load mandrel 22 for transporting at least one roll to be stored. Within the context of the present invention, the load mandrel 22 is pivotably fastened on the running slide 16, and specifically in a plane which extends substantially in parallel with the base plane of the chassis or with the storage plane of the shelf system.

As shown in FIG. 1, the load mandrel 22 further contains a chain conveyor 24, by means of which one or more rolls can be received on the load mandrel 22 and deposited again.

As shown in FIG. 1, the pivoting of the load mandrel 22 takes place by means of suitable bearing, for example by means of two bearing plates 26 and 28, which are locked to the base plate of the running slide 16 in a dimensionally stable manner, by means of braces 30 and 32.

The load mandrel 22 according to the invention can preferably be mounted on the running slide 16 so as to be height-adjustable, and the height can be changed, relative to the base surface of the chassis 12, by means of a suitably driven spindle 34 for example. Such a height-adjustable design of the load mandrel 22 simplifies the handling of rolls when they are received and deposited by the load mandrel 22.

The length of the load mandrel 22 is preferably dimensioned such that it is an integer multiple of the width of the rolls to be transported. Furthermore, a stop can preferably be provided, in order to secure the rolls during transport in the shelf system.

Furthermore, it is preferably possible for at least one support roll and/or mating contact surface to be provided on the underside of the chassis 12, by means of which surface tilting forces can be introduced into the travel rails of the shelf system in the case of a load mandrel 22 that is pivoted out laterally relative to the roll shuttle 10.

Figure 2:
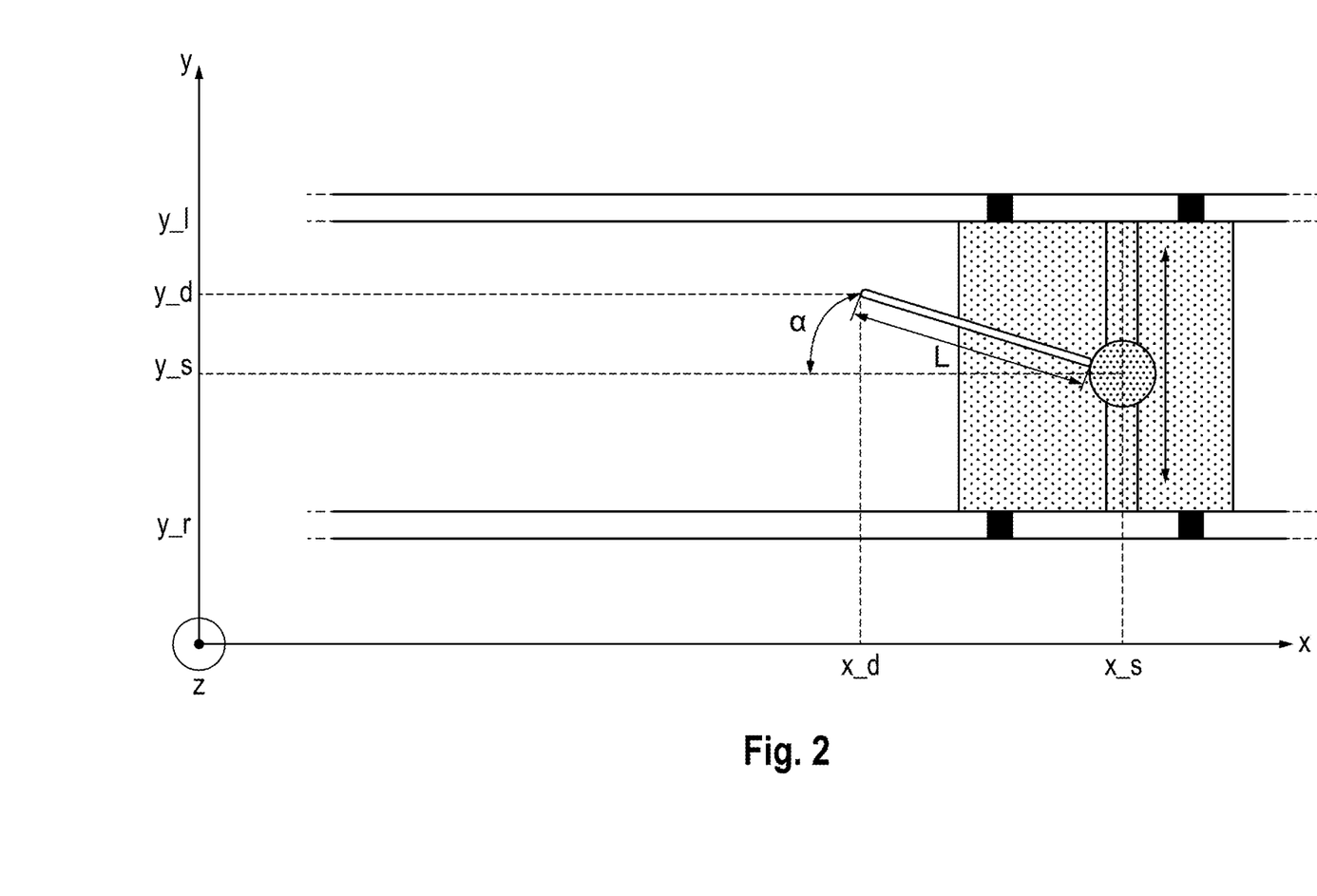
FIG. 2 is a schematic diagram for illustrating the mode of operation of the roll shuttle shown in FIG. 1.

FIG. 2 is a schematic diagram for illustrating the mode of operation of the roll shuttle shown in FIG. 1.

As shown in FIG. 2, the operation of the roll shuttle 10 in the shelf system can preferably be described by a coordinate system, in which the direction of travel forms the x-axis, a storage direction forms the y-axis, and a movement direction in the height direction forms the z-axis.

As shown in FIG. 2, for the operation of the roll shuttle 10 there is a degree of freedom with respect to the positioning of the chassis according to the $x\_s$ coordinate. The y-position of the running slide relative to the chassis is described by $y\_s$, and the height adjustment of the load mandrel relative to the chassis is described by $z\_s$. A further degree of freedom with respect to the operation of the roll shuttle is the pivot angle of the load mandrel a.

Assuming that the load mandrel has a length L, the position of the tip of the load mandrel can now be expressed by the following relationships:

$$x\_d = x\_s - L*\cos \alpha$$

$$y\_d = y\_s + L*\sin \alpha$$

Within the context of the present invention, it is intended for a superimposed movement of the roll shuttle 10 in the x-direction and simultaneously pivoting of the load mandrel 22 to be made possible, by means of the running slide. In this case, the operating condition is:

$$y\_l < y\_d < y\_r$$

If the above relationships for $x\_d$ and $y\_d$ are inserted into this operating condition, and it is solved according to a, then it is clear that the reliable pivot angle α depends on the positioning $y\_s$ of the load mandrel 22 and the length L of the load mandrel 22 according to:

$$\arcsin[(y\_l - y\_s)/L] > \alpha(y\_s) > \arcsin[(y\_r - y\_s)/L]$$

If this condition is met, it is possible to move the roll shuttle 10 in parallel along the running direction of the sliding rails, and simultaneously to position the load mandrel 22 from one side onto the other side.

In general, in the case of an instruction for inserting or removing at least one roll into or from storage, it is thus possible to proceed such that initially a first position and a second position along the travel rail is defined, in order to set the movement of the roll shuttle 10 along the x-direction, within the context of processing the instruction.

Subsequently, during the longitudinal movement of the roll shuttle 10, the position $y\_s$ and the pivot angle α for the running slide, and the pivoting of the load mandrel 22, can in each case be controlled such that the above condition is met. The superimposed longitudinal and pivot movement makes it possible to design the operating times for the insertion and removal of rolls into and from storage particularly efficiently.

Figure 3:
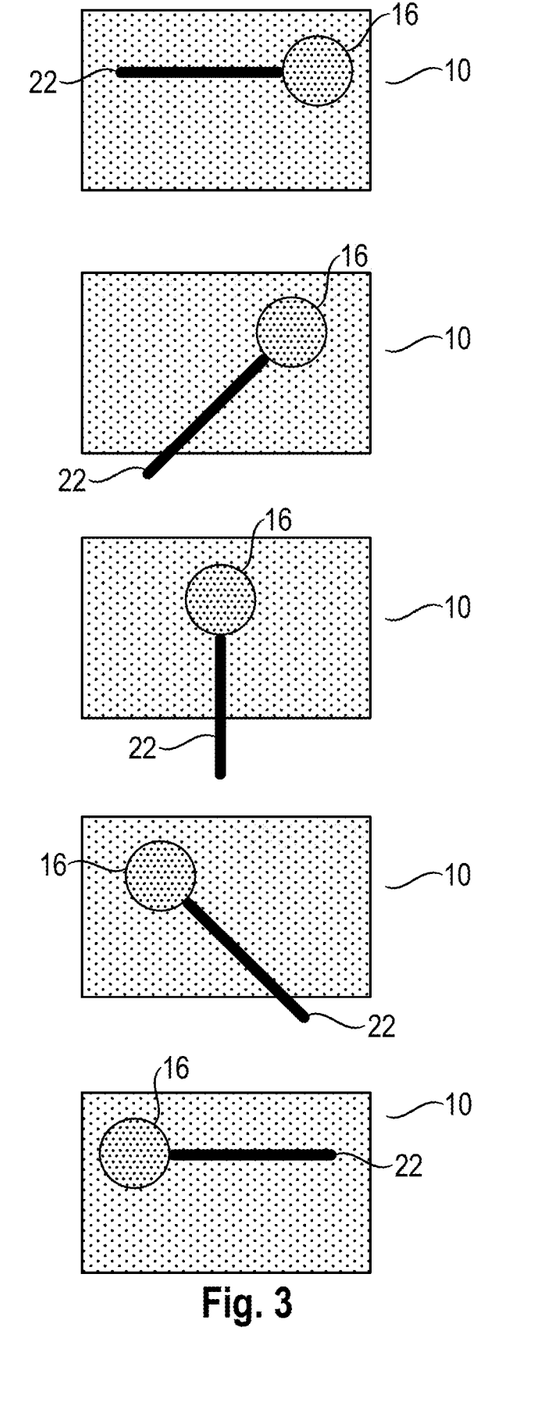
FIG. 3 shows operating states during a superimposed longitudinal movement of the roll shuttle in combination with a repositioning of the mandrel system.

FIG. 3 shows operating states during a superimposed longitudinal movement of the roll shuttle 10 in combination with a repositioning of the mandrel system 22.

It can be seen from FIG. 3 that, when the above-described operating condition is met during the longitudinal movement of the roll shuttle 10 along the sliding rails, the running slide 16 moves successively from one side of the roll shuttle 10 to the other, while simultaneously a pivoting of the load mandrel 22 takes place.

As mentioned, a superimposition of the movements is achieved hereby, and thus particularly efficient handling of rolls during a process for insertion into or removal from storage in the shelf system. At each point in time, it is ensured that, during the longitudinal movement of the roll shuttle 10, the load mandrel 22 never protrudes over the side of the roll shuttle 10 and thus comes into contact with further components of the shelf system.

Figure 4:
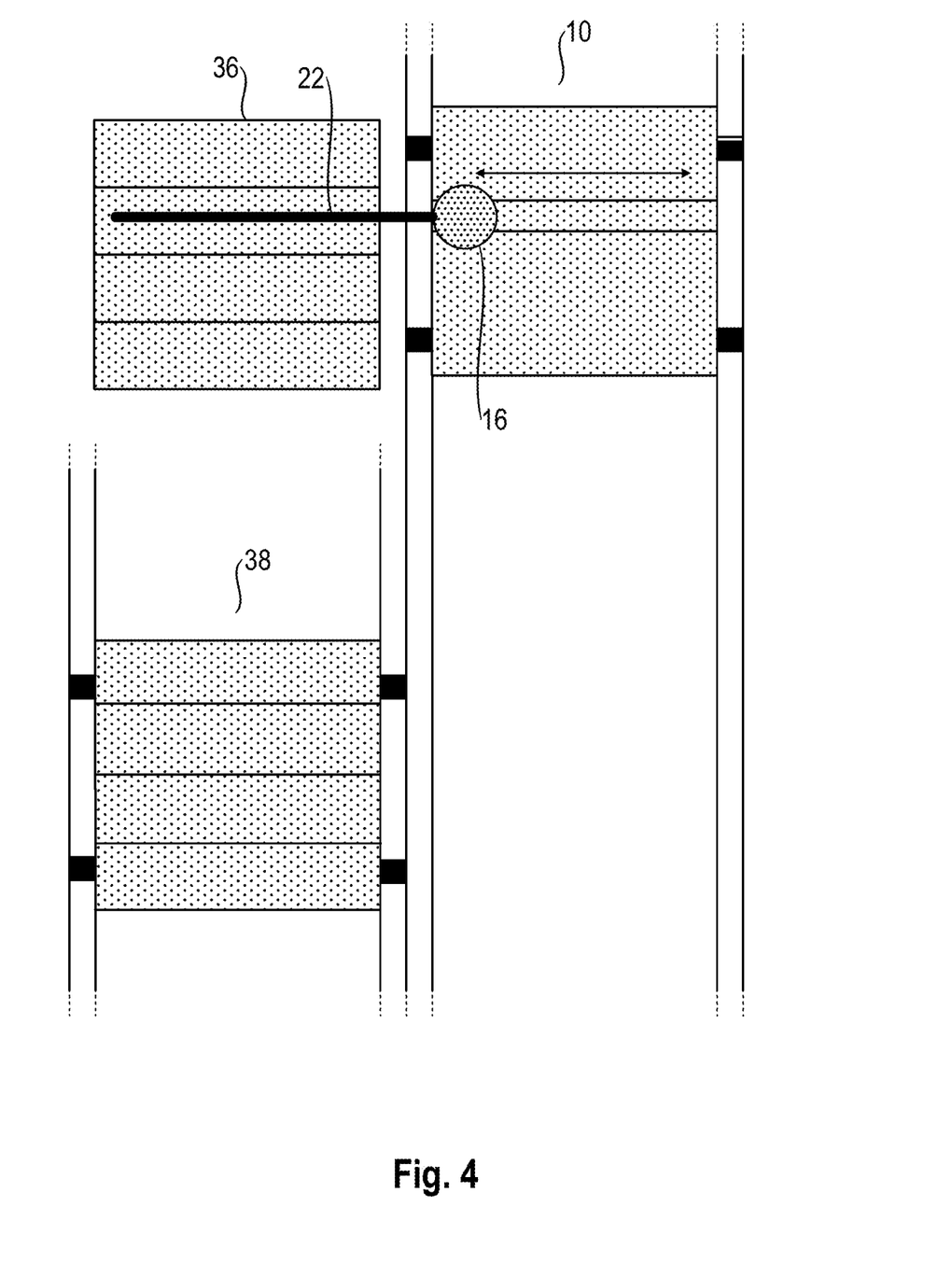
FIG. 4 explains the mode of operation of the roll shuttle for storing rolls, one or more deep, in a stationary storage box or in a mobile storage box.

FIG. 4 explains the mode of operation of the roll shuttle 10 for storing rolls, one or more deep, in a stationary storage box 36 or in a mobile storage box 38.

As shown in FIG. 4, a further operating state of the roll shuttle 10 according to the invention relates to the operation for the actual insertion and removal of rolls into and from storage in the shelf system.

As shown in FIG. 4, in this case the shelf system may comprise a stationary storage box 36, which is fixedly mounted on the shelf system. Alternatively, a storage box can also be designed as a mobile storage box 38, which can be positioned by means of bogie wheels in parallel with and along the travel rails of the roll shuttle 10, relative to the roll shuttle 10.

As shown in FIG. 4, the insertion or removal of rolls into or from storage, either in the stationary storage box 36 or in the mobile storage box 38, takes place by means of the running slide 16 and the load mandrel 22. In this case, the running slide 16 is moved on the lateral edge of the roll shuttle 10, and at the same time the load mandrel 22 is pivoted such that it is positioned above the storage box 36 or 38. It is then possible to achieve, by means of the height adjustment of the running slide 16 and of the load mandrel 22, that either rolls are received on the load mandrel 22 by means of the chain conveyor 24 of the load mandrel 22, or, vice versa, are delivered from the load mandrel 22 to the stationary storage box 36 or to the mobile storage box 38.

As shown in FIG. 4, providing mobile storage boxes 38 increases the flexibility of the storage system since it allows for rolls to be inserted into and removed from storage even if the roll shuttle 10 does not move, provided that the mobile storage box 38 is moved correctly relative to the roll shuttle 10.

Figure 5:
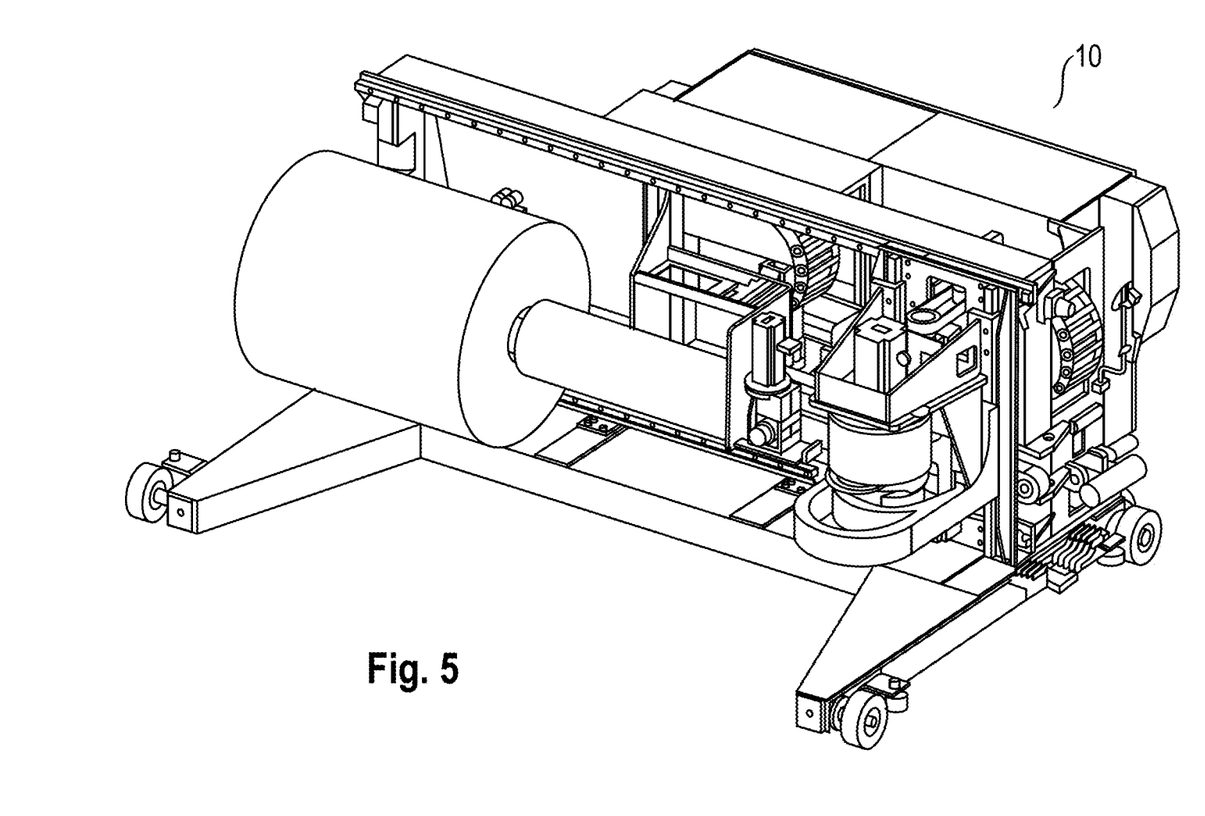
FIG. 5 is a perspective view of the roll shuttle according to the invention, in which rolls of different diameters are positioned on the mandrel system.

FIG. 5 is a perspective view of the roll shuttle 10 according to the invention, in which rolls of different diameters are positioned on the load mandrel 22.

As shown in FIG. 5, the load mandrel 22 of the roll shuttle 10 preferably receives rolls from inside to outside with an increasing number of coils or with an increasing diameter.

As is also shown in FIG. 5, the roll shuttle 10 can be appropriately provided with switchboxes, in which circuit electronics for the operation and the control of the drive and the servomotors for the operation of the load mandrel 22 are provided.

Figure 6:
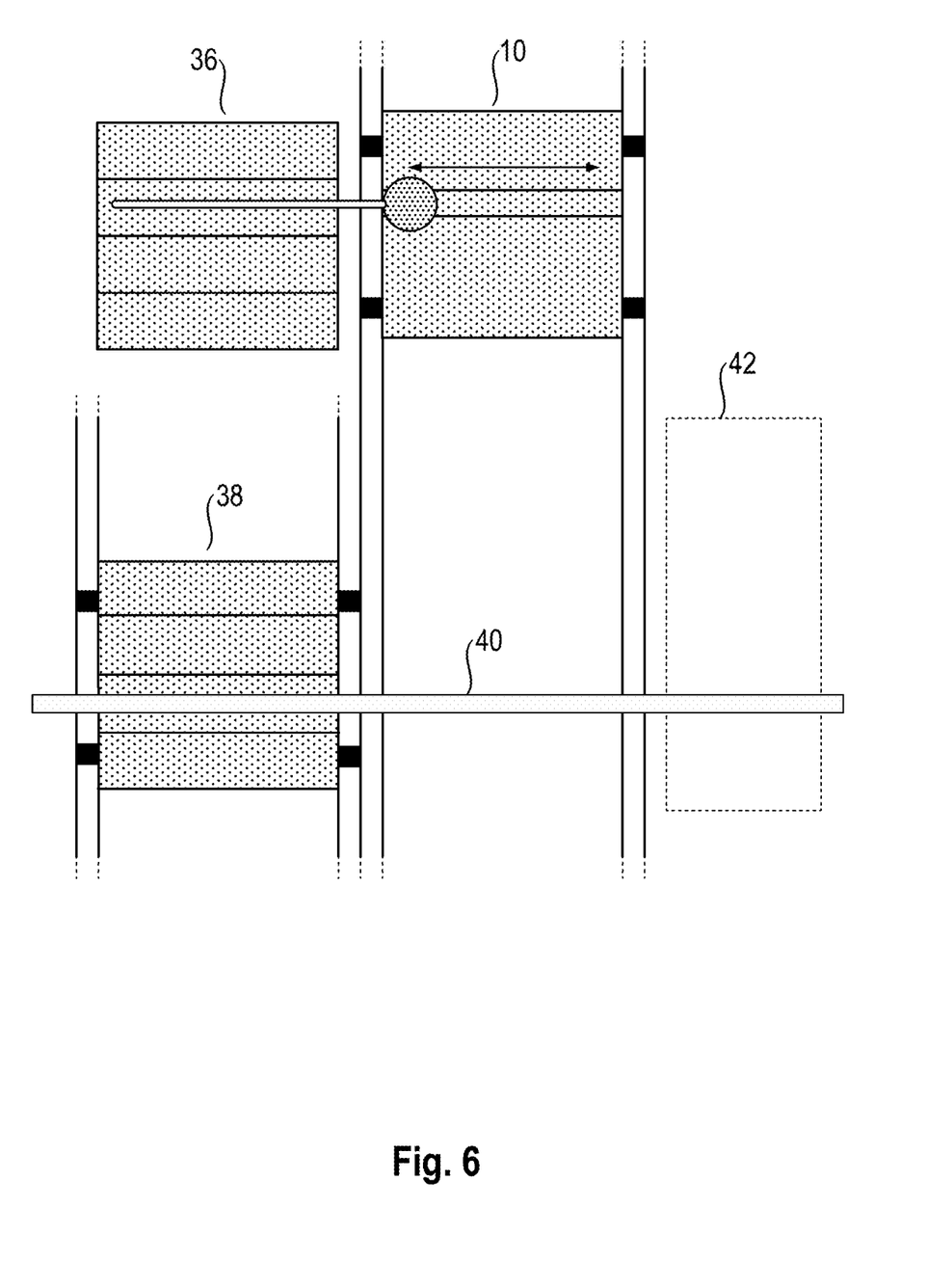
FIG. 6 is a schematic view of a shelf system in which the roll shuttle according to the invention is used in combination with a suspended roll shuttle according to the invention.

FIG. 6 is a schematic view of a shelf system in which the roll shuttle 10 according to the invention is used in combination with a suspended roll shuttle according to the invention.

FIG. 6 shows, similarly to FIG. 4, the roll shuttle 10 according to the invention, the stationary storage box 36, and the mobile storage box 38. With regard to the explanation of these units, reference is made to the above comments relating to FIG. 4.

As is furthermore shown in FIG. 6, within the context of the present invention a suspended roll shuttle can be used. For this purpose, according to the present invention, a carrier rail 40 is provided transversely to the direction of travel of the roll shuttle 10, which rail not only covers the region of travel of the roll shuttle, but rather also the storage region of the storage boxes, preferably the mobile storage boxes 38, and a loading zone which is provided for delivering rolls and removing them from storage.

As shown in FIG. 6, the material flow takes place from the loading zone for example transversely to the direction of travel along the sliding rail 40, to for example the mobile storage box 38. As soon as rolls are suitably stored in the mobile storage box 38, it is possible to move these in parallel with the travel rail of the roll shuttle 10. Subsequently, the roll shuttle 10 can be positioned relative to the mobile storage box 38, in order to then receive rolls, to be stored or removed from storage, from the mobile storage box 38 and move them in a suitable manner to the stationary storage box 36. In the case of removal from storage, the flow of material takes place in the opposite direction, from the stationary storage box 36, via the roll shuttle 10, to the mobile storage box 38, by means of which removal from storage along the suspension rail 40 to the loading zone is then possible.

Figure 7:
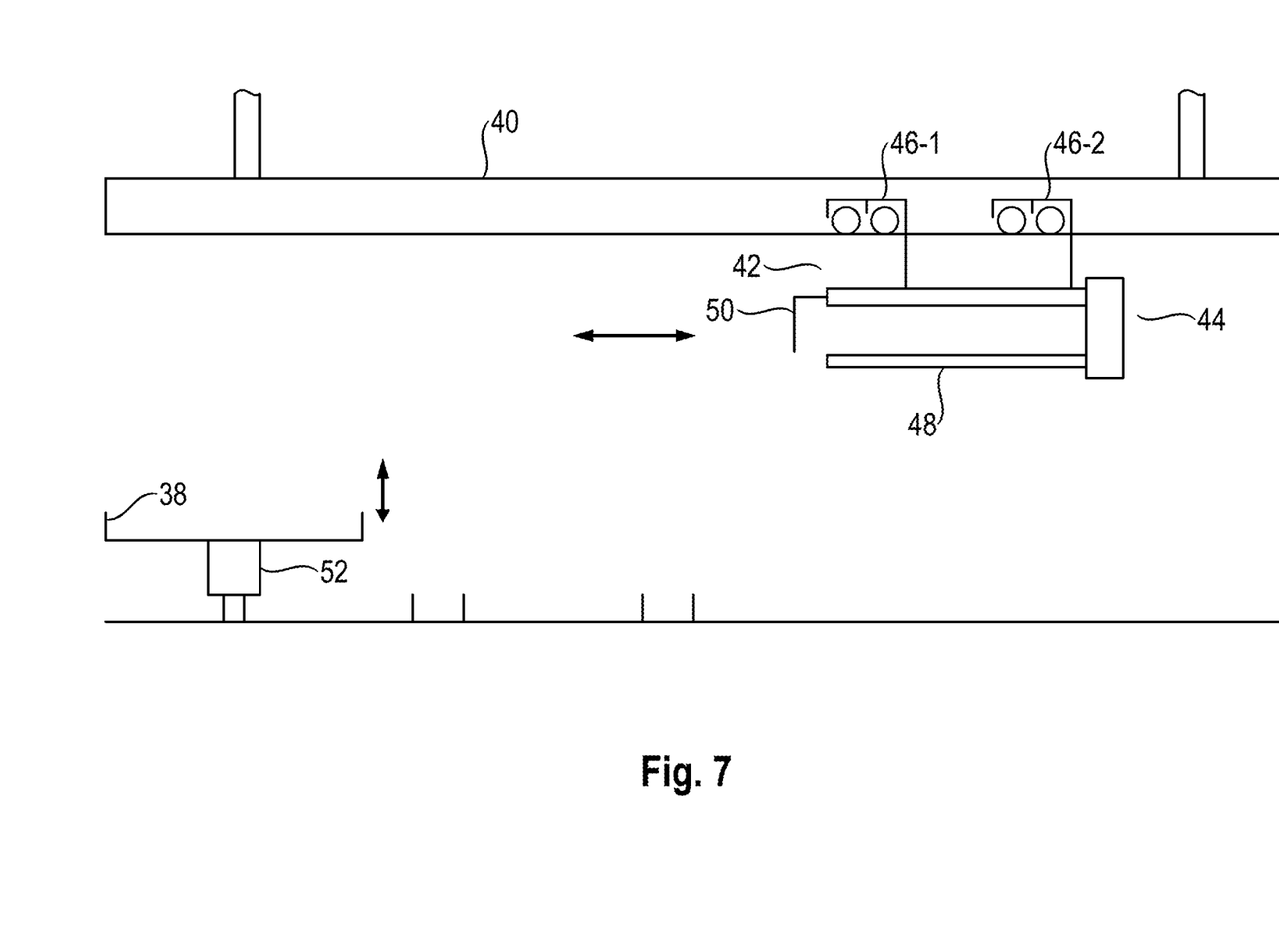
FIG. 7 is a schematic view for illustrating the mode of operation of the suspended roll shuttle according to the invention.

FIG. 7 is a schematic view for illustrating the mode of operation of the suspended roll shuttle according to the invention.

As shown in FIG. 7, according to the present invention a suspended roll shuttle 42 for transporting rolls to a transfer station for further transport in a shelf system is provided. The suspended roll shuttle 42 contains a suspension frame 44, having wheels 46-1, 46-2 mounted thereon, in order to move the suspended roll shuttle along the suspension rail 40 which is mounted on the upper side of a storage plane of the shelf system.

The load mandrel 48 is then fastened to the suspension frame 44, by means of which mandrel rolls to be stored can be moved along the direction of travel of the suspension rail 40. The load mandrel 48 of the suspension frame 44 is preferably equipped with a chain conveyor in order to position rolls to be stored along the load mandrel, i.e. either receive or deposit said rolls. The load mandrel 48 is preferably of a length which is an integer multiple of the width of the rolls to be transported.

As shown in FIG. 7, a pivotable stop 50 can be provided on the suspension frame 44, which stop serves to secure rolls during the transport of the suspension rail 40.

As shown in FIG. 7. as soon as the suspended roll shuttle 42 is positioned above for example the mobile storage box 38, an exchange of rolls between the suspended roll shuttle 42 and the mobile storage box 38 is brought about. For this purpose, the mobile storage box 38 can preferably be provided with a lifting means 52, in order, after raising of the storage surface of the mobile storage box 38, to deliver rolls from the suspended roll shuttle 42 to the mobile storage box 38, or to transfer rolls from the mobile storage box 38 onto the suspended mandrel 48 of the suspended roll shuttle 42.

Figure 8:
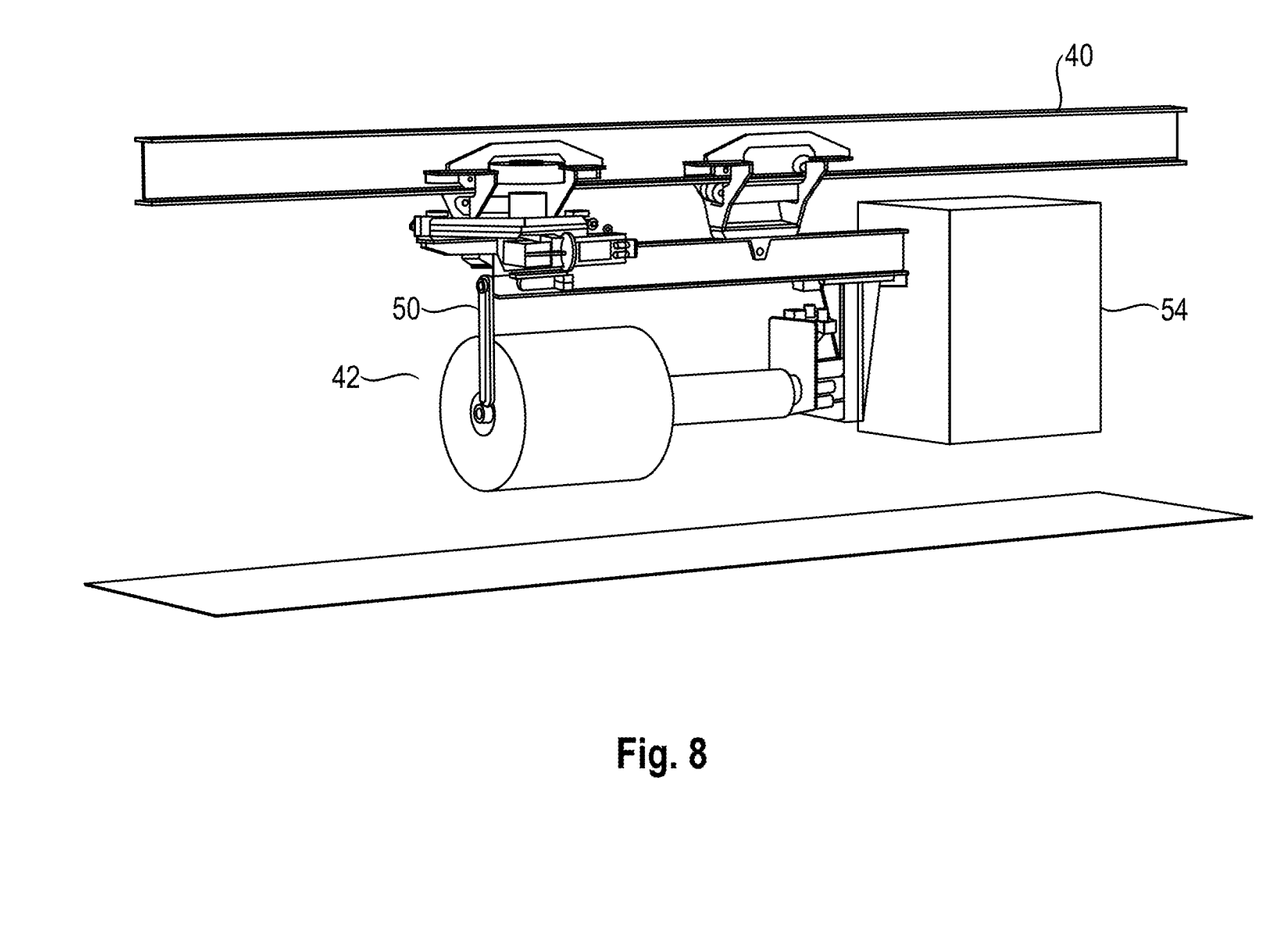
FIG. 8 is a perspective view of the suspended roll shuttle according to the invention, comprising rolls of different diameters mounted on the mandrel system.

FIG. 8 is a perspective view of the suspended roll shuttle 42 according to the invention, comprising rolls of different diameters mounted on the mandrel system.

As shown in FIG. 8, as in the case of the roll shuttle 10, in the case of the suspended roll shuttle 42 too the equipping of the load mandrel is preferably selected such that the diameter of the rolls increases from inside to outside. The stop 50 secures the rolls against sliding off the load mandrel during transport.

As shown in FIG. 8, the suspended roll shuttle 42 can also comprise a unit 54 in which suitable switching means and electronics for the operation of the suspended roll shuttle 42 are provided.

Figure 9:
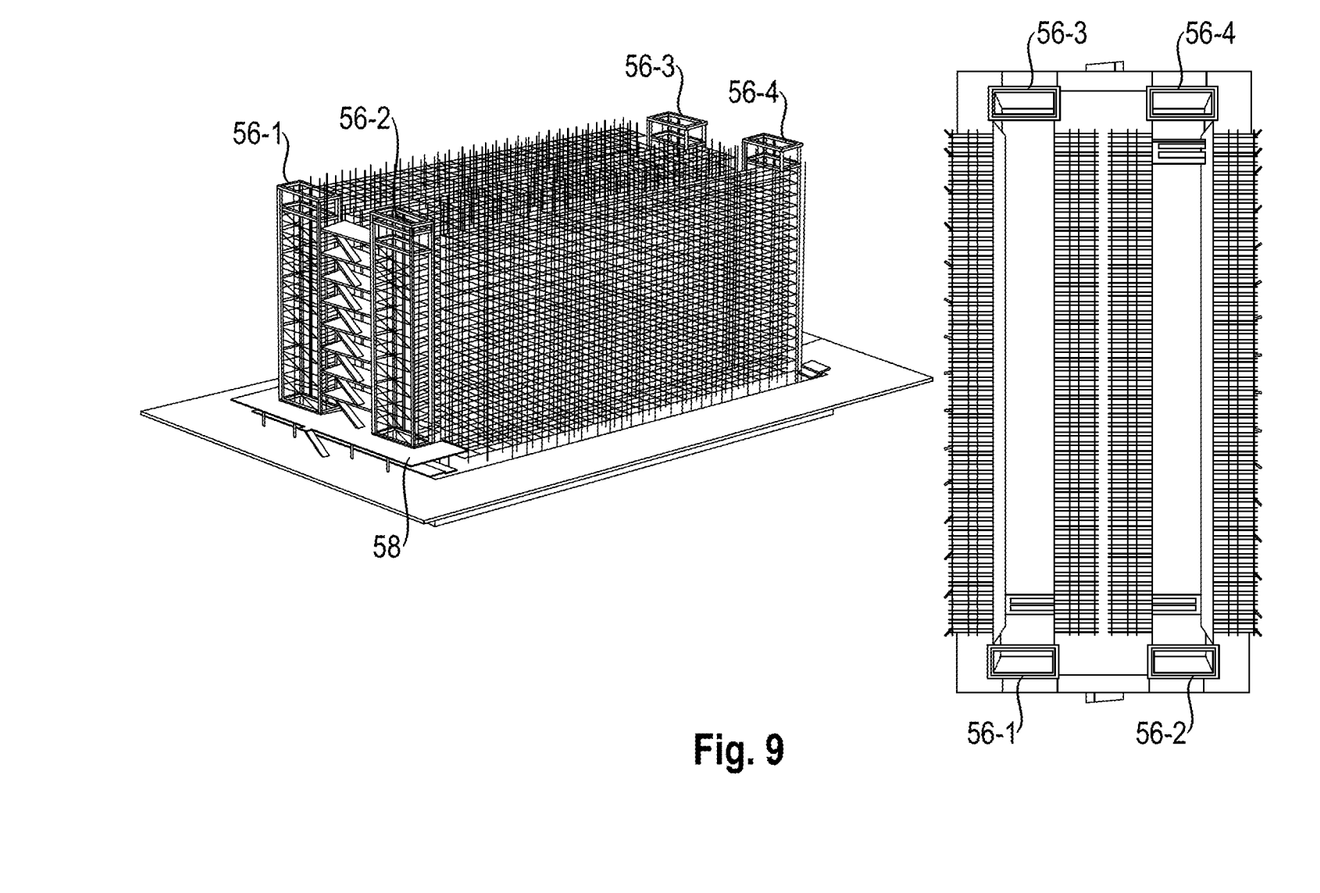
FIG. 9 is a perspective view of the storage system according to the invention.

FIG. 9 is a perspective view of the storage system according to the invention.

As shown in FIG. 9, the shelf system according to the invention for storing and transporting rolls comprises a plurality of storage planes. A plurality of travel rails, which are provided for transport of rolls, extend in each storage plane. A plurality of storage boxes adjoins the respective travel rails in each storage plane. According to the invention, a roll shuttle 10 according to the present invention can now bel moved along the travel rails for transporting rolls.

Preferably, within the context of the present invention, there is a combined use of at least one roll shuttle 10 with at least one suspended roll shuttle 42, as is explained with reference to FIG. 6. In this case, the roll shuttle serves for transport within the shelf system, and the suspended roll shuttle serves for further transport between shelf systems or individual functional regions within one shelf system. It is furthermore possible, by means of a suspended roll shuttle, to distribute rolls and other storage goods to widely dispersed delivery and receiving stations, and/or to place said rolls into storage proceeding from said delivery and receiving stations.

As shown in FIG. 9, one or more lift systems 56 can preferably be provided on the end faces of the shelf system. These also allow for vertical movement of the roll shuttle 10 according to the invention, over a plurality of storage planes of the shelf system. Preferably, each lift 56 serves one loading zone 58 of the shelf system, and the number of roll shuttles 10 or suspended roll shuttles 42 used in each storage plane can be configured freely, depending on the use situation.

As shown in FIG. 9, the shelf system according to the invention further comprises an inspection platform 58, in order to allow access to the suspended roll shuttle for maintenance or servicing activities. As is furthermore shown in FIG. 9 it is possible to guide the travel rails for the suspended roll shuttle in a housing 60. This allows, for example, for improved protection from weather or for protection of goods, to be transported, from outside influences.

Figure 10:
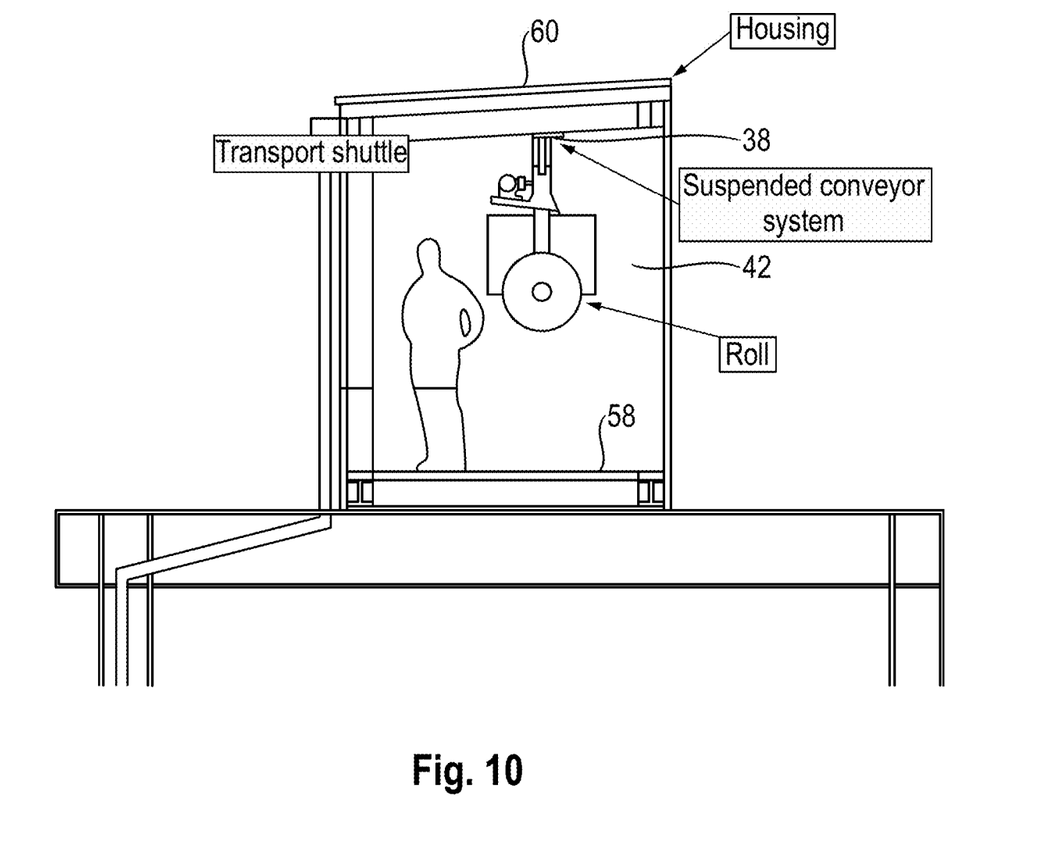
FIG. 10 shows an example for access to a suspended roll shuttle.

FIG. 10 shows an example for access to a suspended roll shuttle. This shows that in addition the inspection platform can also be received in a housing 60, which allows for improved protection for service personnel. The inspection platform is preferably arranged, with respect to height, such that comfortable access for the service personnel to the suspended roll shuttle is possible. This is a preferred embodiment, in order to allow for operation of shelf components, but also handling of rolls inside the shelf system.

Figure 11:
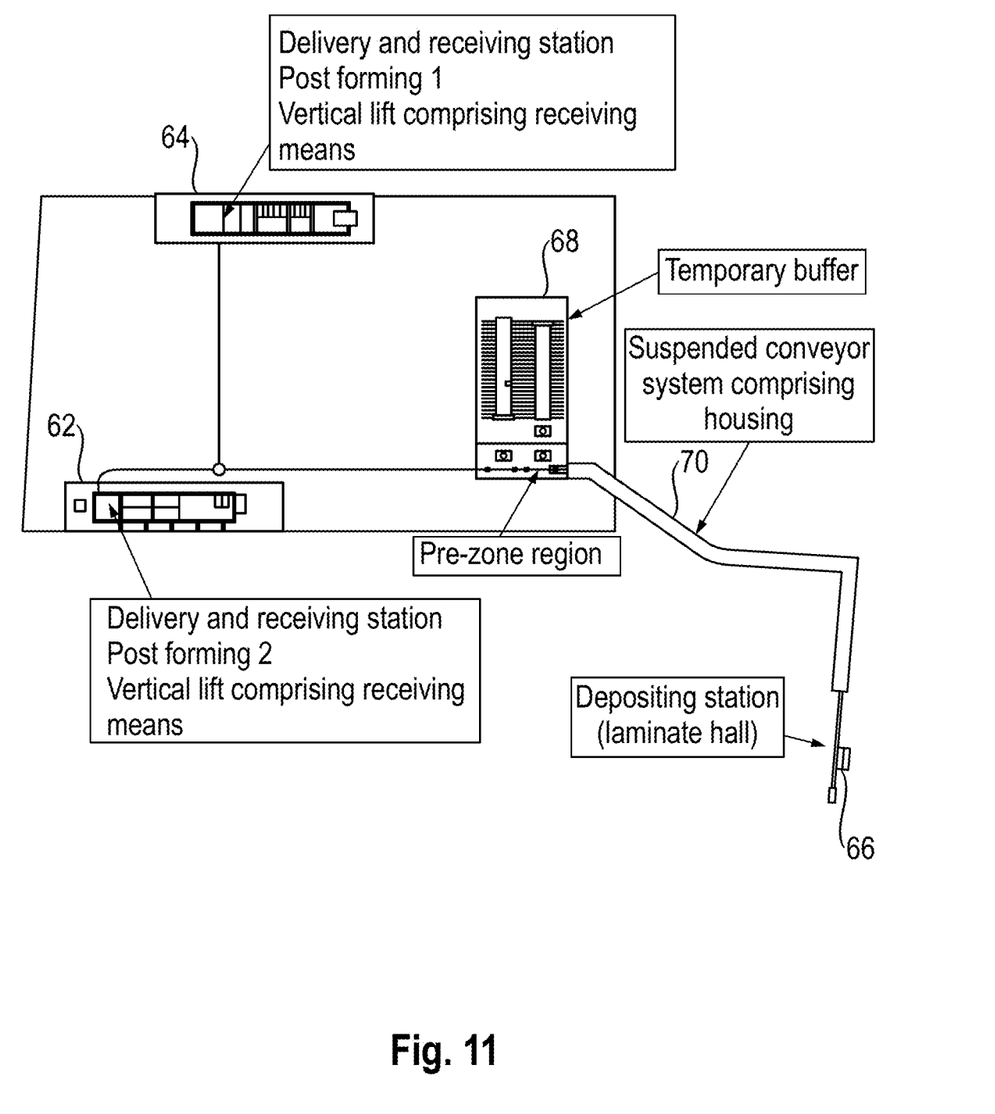
FIG. 11 illustrates the function of the suspended roll shuttle system as a transport system between individual functional units within a shelf system.

FIG. 11 illustrates the function of the suspended roll shuttle system as a transport system between individual functional units within a shelf system. As shown in FIG. 11, or example functional units can be formed by delivery and receiving stations 62, 64, 66, the shelf system itself, as shown in FIG. 9, and a temporary store 68. According to FIG. 11, the temporary store can be equipped with a pre-zone region, and thus serve as a buffer for the insertion and removal of goods and rolls into and from storage in the shelf system. The pre-zone region can furthermore be stocked with goods or goods can be transported out of the pre-zone region to the corresponding delivery station 66, by a suspended conveyor system 70. In general, suspended conveyor systems according to the present invention are furthermore suitable for interconnecting entire shelf systems.

Figure 12:
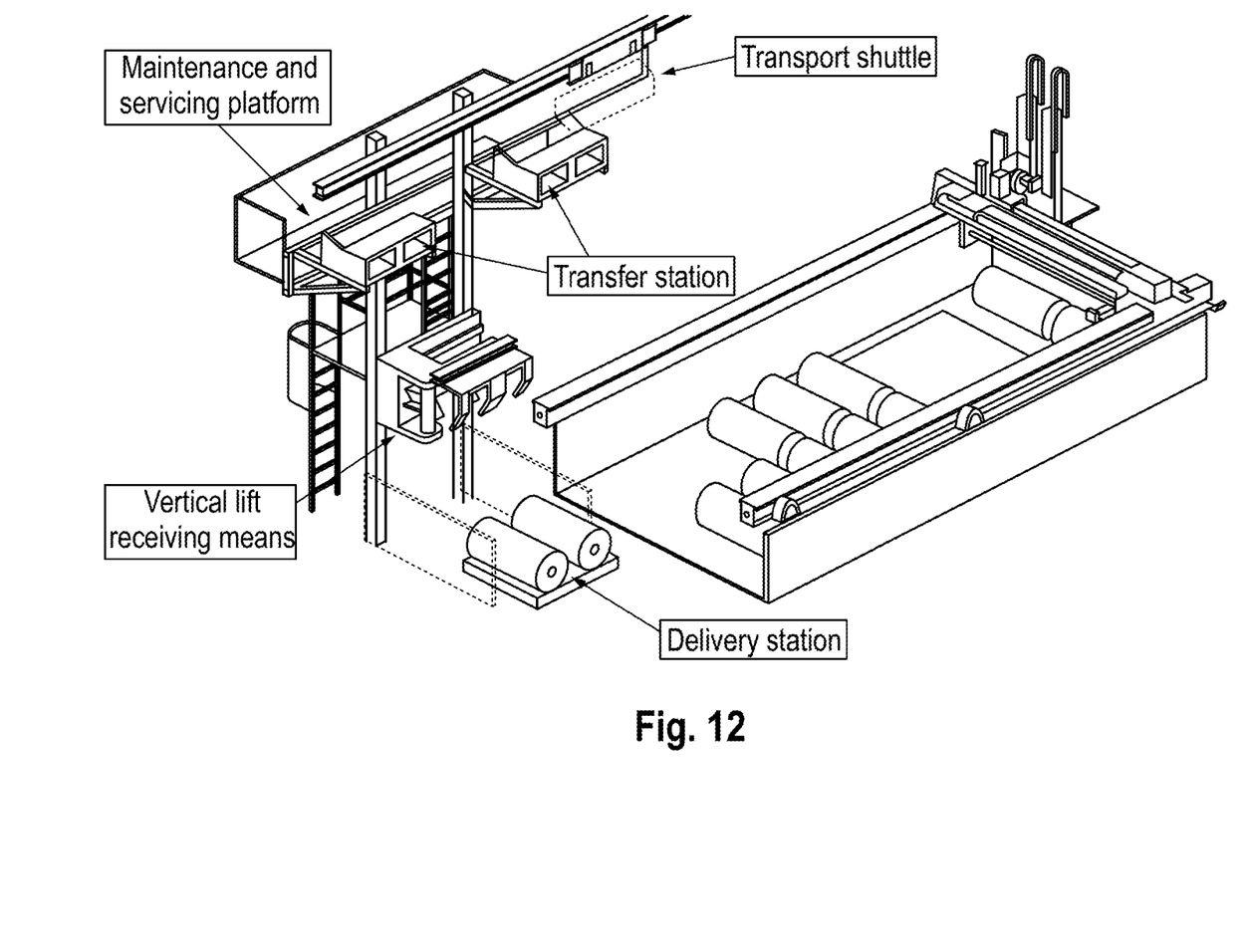
FIG. 12 shows a further configuration, by way of example, of partial components of the shelf system according to the present invention.

FIG. 12 shows a further configuration, by way of example, of partial components of the shelf system according to the present invention. As shown in FIG. 12, the suspended roll shuttle 42 can also be equipped over various heights. A vertical lift comprising receiving means 72 which approaches a delivery station 74 in a suitable manner is used for this purpose. After the roll goods have been received, the vertical lift 72 travels to one or more transfer stations 76, 78, which the transport shuttle 42 can travel past. At the transfer stations 76, 78, the transport shuttle 42 then takes over the roll goods, in order to move them in the shelf system. Here, too, it is advantageous to provide a maintenance or service platform 58, such that service personnel can reach it using a ladder 80.

Overall, the present invention allows for the use of a very efficient roll shuttle or suspended roll shuttle in combination with a shelf system for achieving storage of rolls one or more deep. The handling of rolls is ensured in particular by using load mandrel systems. With regard to the transport of rolls in the shelf system, rolls can furthermore optimally be moved on a suspended roll shuttle.

The invention claimed is:

1. A roll shuttle for transporting rolls in a shelf system, comprising:
a chassis, having wheels mounted thereon, in order to move the roll shuttle along travel rails which are laid in a storage plane of the shelf system;
a running slide, which is mounted on the chassis so as to be movable relative to the direction of travel of the roll shuttle, in a direction which deviates from the direction of travel of the roll shuttle by a predetermined angle greater than zero; and
a load mandrel for transporting at least one roll to be stored, which mandrel is pivotably fastened to the running slide in a plane substantially in parallel with the storage plane of a shelf system,
wherein the load mandrel is equipped with a chain conveyor in order to position rolls to be stored along the load mandrel.

2. The roll shuttle according to claim 1, wherein the running slide is movable transversely to the direction of travel of the roll shuttle.

3. The roll shuttle according to claim 1, wherein a stop is provided on the load mandrel, in order to secure rolls during transport in the shelf system.

4. The roll shuttle according to claim 1, wherein the load mandrel is of a length which is an integer multiple of the width of the rolls to be transported.

5. The roll shuttle according to claim 1, comprising a lifting system, in order to raise and/or lower the load mandrel relative to the chassis.

6. The roll shuttle according to claim 1, wherein at least one support roll and/or mating contact surface is provided on the underside of the chassis, by means of which surface tilting forces can be introduced into the travel rails of the shelf system in the case of a load mandrel that is pivoted out laterally relative to the roll shuttle.

7. A shelf system for storing and transporting rolls, comprising:
at least one storage plane having at least one pair of travel rails which are provided for transport of rolls;
a plurality of storage boxes which are placed adjacently to the at least one pair of travel rails, in the storage plane; and
at least one roll shuttle according to claim 1, which is movable along at least one pair of travel rails for transport of rolls.

8. The shelf system according to claim 7, comprising at least one suspension rail which is arranged above the storage plane, transversely to the direction of travel of the at least one pair of travel rails, in order to form a travel path for a suspended roll shuttle above the storage plane, wherein the suspended roll shuttle comprises:
a suspension frame, having wheels mounted thereon, in order to move the suspended roll shuttle along at least one suspension rail which is mounted above a storage plane of the shelf system; and
a load mandrel to be fastened on the suspension frame for transporting at least one roll to be stored in the direction of the suspension rail.

9. The shelf system according to claim 8, wherein the suspension rail serves a loading zone of the shelf system, in order to support a delivery or removal from storage of rolls.

10. The shelf system according to claim 8, wherein the suspension rail is provided for connecting various receiving and delivery points in the shelf system by means of distributing stations which can be coupled to a plurality of suspension rails, and for connecting different shelf systems or for connecting individual functional regions within one shelf system.

11. The shelf system according to claim 8, wherein the suspension rail is guided in a housing.

12. The shelf system according to claim 7, comprising an inspection platform in order to allow access to the at least one roll shuttle and/or the at least one suspended roll shuttle, for maintenance or servicing activities.

13. The shelf system according to claim 7, wherein at least one storage box, which adjoins the at least one pair of travel rails, is movable in the direction of travel of the at least one pair of travel rails.

14. The shelf system according to claim 7, comprising at least two storage planes, wherein at least one lift system is provided on at least one outer side face of the shelf system, in order to relocate roll shuttles among different storage planes.

* * * * *